US012565426B2

(12) United States Patent
Pan et al.

(10) Patent No.: US 12,565,426 B2
(45) Date of Patent: Mar. 3, 2026

(54) PHOTOTHERMAL CATALYTIC METHOD FOR PRODUCTION OF HYDROGEN PEROXIDE WITHOUT SACRIFICIAL REAGENTS ON BASIS OF PORPHYRIN-BASED SUPERMOLECULE

(71) Applicant: Jiangnan University, Wuxi (CN)

(72) Inventors: Chengsi Pan, Wuxi (CN); Yaning Zhang, Wuxi (CN); Yongfa Zhu, Wuxi (CN); Gaoming Bian, Wuxi (CN); Yuming Dong, Wuxi (CN); Ying Zhang, Wuxi (CN); Yang Lou, Wuxi (CN)

(73) Assignee: Jiangnan University, Wuxi (CN)

( * ) Notice: Subject to any disclaimer, the term of this patent is extended or adjusted under 35 U.S.C. 154(b) by 912 days.

(21) Appl. No.: 17/851,325

(22) Filed: Jun. 28, 2022

(65) Prior Publication Data

US 2022/0340423 A1     Oct. 27, 2022

(30) Foreign Application Priority Data

Jan. 12, 2022    (CN) ........................ 202210030267.X

(51) Int. Cl.
| | |
|---|---|
| *C01B 15/027* | (2006.01) |
| *B01J 19/12* | (2006.01) |
| *B01J 31/02* | (2006.01) |
| *B01J 35/39* | (2024.01) |
| *C01B 15/013* | (2006.01) |

(52) U.S. Cl.
CPC ........... *C01B 15/027* (2013.01); *B01J 19/127* (2013.01); *B01J 31/0241* (2013.01); *B01J 31/0271* (2013.01); *B01J 35/39* (2024.01); *C01B 15/013* (2013.01); *B01J 2219/0877* (2013.01); *B01J 2219/0892* (2013.01); *B01J 2219/1203* (2013.01); *B01J 2231/70* (2013.01); *B01J 2531/008* (2013.01)

(58) Field of Classification Search
CPC ...... B01J 35/39; B01J 19/127; B01J 31/0241; B01J 31/0271; C01B 15/013
See application file for complete search history.

(56) References Cited

U.S. PATENT DOCUMENTS

2014/0141346 A1* 5/2014 Fukuzumi ............. C01B 15/027
204/157.5

OTHER PUBLICATIONS

Keiko et al. The Influence of Aggregation of Porphyrins on the Efficiency of Chem. Pharm. Bull. 54(7) 1004-1009 (Year: 2006).*

(Continued)

*Primary Examiner* — James Lin
*Assistant Examiner* — Abelline Katusiime Fionah
(74) *Attorney, Agent, or Firm* — IPRO, PLLC; Na Xu

(57) ABSTRACT

A photothermal catalytic method for production of hydrogen peroxide without a sacrificial reagent on the basis of a porphyrin-based supermolecule is provided. The method includes the following steps: uniformly mixing a porphyrin-based supermolecule photocatalyst with a concentration of 0.3-1.5 g/L with ultrapure water, conducting irradiation with a visible light for a period of time under stirring at a temperature of 40-80° C. and an $O_2$ flow rate of 50-150 mL/min, and then filtering and concentrating a reaction liquid to obtain an aqueous hydrogen peroxide solution with a high concentration. The method is simple in operation, mild in reaction conditions and high in production of the hydrogen peroxide.

13 Claims, 3 Drawing Sheets

(56)         References Cited

OTHER PUBLICATIONS

Dogukan et al. Photoelectrocatalytic Synthesis of Hydrogen Peroxide by Molecular Copper-Porphyrin Supported on Titanium Dioxide Nanotubes. ChemCatChem 2018, 10, 1793-1797. (Year: 2017).*
Google search (Year: 2025).*

* cited by examiner

PHOTOTHERMAL CATALYTIC METHOD FOR PRODUCTION OF HYDROGEN PEROXIDE WITHOUT SACRIFICIAL REAGENTS ON BASIS OF PORPHYRIN-BASED SUPERMOLECULE

TECHNICAL FIELD

The present disclosure relates to a photothermal catalytic method for production of hydrogen peroxide without a sacrificial reagent on the basis of a porphyrin-based supermolecule, and belongs to the field of the green chemical industry.

BACKGROUND

An aqueous solution of hydrogen peroxide is known as a hydrogen peroxide solution. As a green and efficient oxidizing reagent, the hydrogen peroxide has been widely used in bleaching of pulp and textiles, synthesis of chemicals, medical disinfection, additive for combustion of rocket propulsion and other fields. At present, the following two methods are mainly used for commercial production of the hydrogen peroxide at home and abroad: an anthraquinone (AO) method and a thermocatalytic method. Although the two methods have the advantages of low cost and large synthesis amount, respective shortcomings are also obtained. According to the AO method, flammable and explosive $H_2$ and a highly toxic heavy aromatic hydrocarbon are used as raw materials. Once the raw materials are introduced at a high flow rate, combustion and explosion will be caused by frictional static electricity in a pipeline. Moreover, according to the AO method, a palladium catalyst needs to be used. Once the palladium catalyst leaks into an oxidation system or an extraction system, the hydrogen peroxide will be decomposed violently, leading to very serious consequences. According to a Chinese patent CN103496674A, an AO method for preparing hydrogen peroxide in a fully acidic working liquid system is provided. An original acid and alkali alternating working liquid system is improved. However, the method is still a synthetic method with high energy consumption in essence, and the service life of equipment may be shortened under a fully acidic reaction condition. According to the thermocatalytic method, the hydrogen peroxide is directly prepared by heating catalysis with a mixed gas of $H_2$ and $O_2$. As the mixed gas is explosive in a wide concentration range, a greater safety hazard is caused. For example, according to a Chinese patent CN108144605A, a preparation method of a supported alloy catalyst and a method for synthesizing hydrogen peroxide by using a mixed gas of $H_2$ and $O_2$ with the catalyst are provided. According to a U.S. Pat. No. 7,364,718B2, a method for preparing hydrogen peroxide by using a mixed gas of $H_2$ and $O_2$ with a precious metal catalyst is provided. According to the two patents, precious metals such as gold, palladium and platinum are used, and the production cost is relatively high. Meanwhile, a mixed gas of $H_2$ and $O_2$ is used as a raw material, which is quite dangerous. Therefore, it is extremely challenging for production of the hydrogen peroxide with safety, high efficiency, energy conservation and environmental protection.

According to an emerging photocatalytic technology, $H_2O$ and $O_2$ are used as raw materials, and inexhaustible sunlight is used as an energy source. Mixing of $H_2$ and $O_2$ is avoided, and the technology is safe and green and has attracted much attention in recent years. As a main photoactivity component of chlorophyll, a porphyrin-based supermolecule photocatalyst has the advantages of having strong light absorption ability (to absorb all wavelengths of visible lights) and special structure for promoting separation and transport of photogenerated charges, and being green and free of toxicity. As one of potential efficient photocatalysts, the porphyrin-based supermolecule photocatalyst has been widely studied. It has been preliminarily reported that the porphyrin-based supermolecule photocatalyst is used for photocatalytic preparation of the hydrogen peroxide by directly using $H_2O$ and $O_2$ as raw materials (K. Komagoe, T. Katsu, Anal Sci, 22(2006) 255-258). Meanwhile, according to a Chinese patent CN110102342A, a porphyrin-sensitized carbon nitride photocatalyst for the production of hydrogen peroxide and a preparation method thereof are provided. According to the method, production of the hydrogen peroxide is promoted by a synergistic effect between porphyrin and carbon nitride, and the hydrogen peroxide produced under irradiation of visible light has a concentration of 6.32 $\mu M$. However, it has not been reported yet that a tetraphenylporphyrin derivative is separately used in efficient photocatalytic preparation of the hydrogen peroxide by using $H_2O$ and $O_2$ as raw materials.

SUMMARY

In the present disclosure, tetraphenylporphyrin derivatives are used as photocatalysts for preparation of hydrogen peroxide by photothermal catalysis with $H_2O$ and $O_2$ as raw materials. The current practical requirements for compatibility between the chemical industry and the ecological environment and sustainable development are met, and therefore, an important industrial application value and social significance are achieved.

The present disclosure aims to provide a photothermal catalytic method for production of hydrogen peroxide without a sacrificial reagent on the basis of a porphyrin-based supermolecule and use of the method in preparation of the hydrogen peroxide. According to the new photothermal catalytic method for preparing the hydrogen peroxide provided in the present disclosure, no organic solvent is used, and the method is environmentally friendly and free of pollution. $O_2$ is used as an oxygen source, a visible light is used as an energy source, and the method is low in energy consumption and high in safety. The method is simple in operation, mild in reaction conditions and high in production of the hydrogen peroxide per unit time.

The present disclosure has the following technical solutions.

A first objective of the present disclosure is to provide a photothermal catalytic method for production of hydrogen peroxide without a sacrificial reagent on the basis of a porphyrin-based supermolecule. The method includes the following steps:

(1) ultrasonically dispersing a porphyrin catalyst in water to obtain a porphyrin catalyst dispersion with a concentration of 0.3-1.5 g/L of the porphyrin catalyst, wherein the porphyrin catalyst is at least one selected from the group consisting of 5,10,15,20-tetrakis(4-methoxycarbonylphenyl)porphyrin (TPP-COOMe), 5,10,15,20-tetrakis(4-sulfophenyl)porphyrin (TPPS), 5,10,15,20-tetrakis(4-hydroxyphenyl)porphyrin (THPP), 5,10,15,20-tetrakis(4-aminophenyl)porphyrin (TAPP), 5,10,15,20-tetrakis(4-pyridyl)porphyrin (TPyP), and 5,10,15,20-tetrakis(4-carboxyphenyl)porphyrin (TCPP);

(2) continuously introducing $O_2$ into the porphyrin catalyst dispersion obtained in step (1) at a temperature of 40-80° C., and conducting stirring and irradiation with a visible light for a reaction for a period of time; and (3) filtering a reaction product obtained in step (2) to obtain an aqueous hydrogen peroxide solution (hydrogen peroxide solution).

As a preferred embodiment of the present disclosure, the porphyrin catalyst is at least one selected from the group consisting of TCPP, THPP and TPPS.

Further preferably, the porphyrin catalyst is TCPP.

As a preferred embodiment of the present disclosure, in step (2), the reaction is carried out at a temperature of 60° C.

As a preferred embodiment of the present disclosure, in step (2), the oxygen is introduced at a flow rate of 50-150 mL/min.

Further preferably, in step (2), the oxygen is introduced at a flow rate of 80 mL/min.

As a preferred embodiment of the present disclosure, in step (3), the visible light has a light intensity of 80-150 mW/cm$^2$.

Further preferably, in step (3), the visible light has a light intensity of 90 mW/cm$^2$.

As a preferred embodiment of the present disclosure, in step (2), the irradiation is conducted for 2-24 h.

As a preferred embodiment of the present disclosure, an amount ratio of the porphyrin catalyst to the water is 1 mg: 2 mL.

As a preferred embodiment of the present disclosure, in step (1), the ultrasonic treatment is conducted for 5-15 min.

As a preferred embodiment of the present disclosure, in step (2), the visible light is provided by a xenon lamp with an additional 420 nm cut-off filter ($\lambda \geq 420$ nm).

As a preferred embodiment of the present disclosure, in step (2), the stirring is conducted at a speed of 500-1,500 rpm.

Further preferably, in step (2), the stirring is conducted at a speed of 600-800 rpm.

As a preferred embodiment of the present disclosure, the step (3) further includes concentrating a filtrate. Specifically, the filtrate may be concentrated by distillation under reduced pressure.

As a preferred embodiment of the present disclosure, the concentration under reduced pressure is conducted at a temperature of 55-65° C.

As a preferred embodiment of the present disclosure, the step (3) further includes washing a filter cake with ultrapure water, drying the washed filter cake and recovering the porphyrin catalyst.

As a preferred embodiment of the present disclosure, in step (3), the filter cake is dried by freeze drying or vacuum drying at 60° C.

The present disclosure mainly has the following beneficial effects.

(1) According to the photothermal catalytic method for production of hydrogen peroxide without a sacrificial reagent on the basis of a porphyrin-based supermolecule provided in the present disclosure, no organic solvent (such as ethanol, isopropanol and benzyl alcohol) is used as a sacrificial reagent, and the method is environmentally friendly and free of pollution.

(2) According to the photothermal catalytic method for production of hydrogen peroxide without a sacrificial reagent on the basis of a porphyrin-based supermolecule provided in the present disclosure, O$_2$ is used as an oxygen source at atmospheric pressure, and sunlight (a visible light) is used as an energy source. Compared with the industrial AO method for indirectly synthesizing hydrogen peroxide, the method of the present disclosure is lower in energy consumption and high in safety.

(3) Compared with a method for preparing hydrogen peroxide by directly mixing oxygen and hydrogen, the photothermal catalytic method for production of hydrogen peroxide without a sacrificial reagent on the basis of a porphyrin-based supermolecule provided in the present disclosure is safer.

(4) Compared with a traditional photocatalytic method for preparation of hydrogen peroxide, the method has the advantages that an organic sacrificial reagent is avoided from the source, and the problem of difficult separation of an oxidation product of the organic sacrificial reagent is solved.

(5) In the present disclosure, photothermal catalytic performance of the porphyrin catalyst such as the TPP-COOMe, the TPPS, the THPP, the TAPP, the TPyP and the TCPP in production of the hydrogen peroxide is found and utilized. Compared with the technical scheme for photocatalytic production of hydrogen peroxide by only using a porphyrin catalyst at room temperature, the photothermal catalytic method for production of hydrogen peroxide without a sacrificial reagent on the basis of a porphyrin-based supermolecule provided in the present disclosure has the advantage that the yield of the hydrogen peroxide per unit time is greatly increased.

(6) The method for preparation of the hydrogen peroxide in the present disclosure is mild in reaction conditions and simple in operation. The commercially available hydrogen peroxide with a concentration of about 3.00 wt % may be obtained by only uniformly mixing the porphyrin-based supermolecule photocatalyst with ultrapure water, conducting irradiation with a visible light for a period of time under stirring at a temperature of 40-80° C. and an O$_2$ flow rate of 50-150 mL/min, filtering the reaction liquid to obtain hydrogen peroxide with a high concentration, and then conducting concentration by distillation under reduced pressure. The hydrogen peroxide prepared by using the method of the present disclosure has the advantages of high yield and efficient and stable catalytic performance, and has a great application prospect.

DETAILED DESCRIPTION

Figure 1:
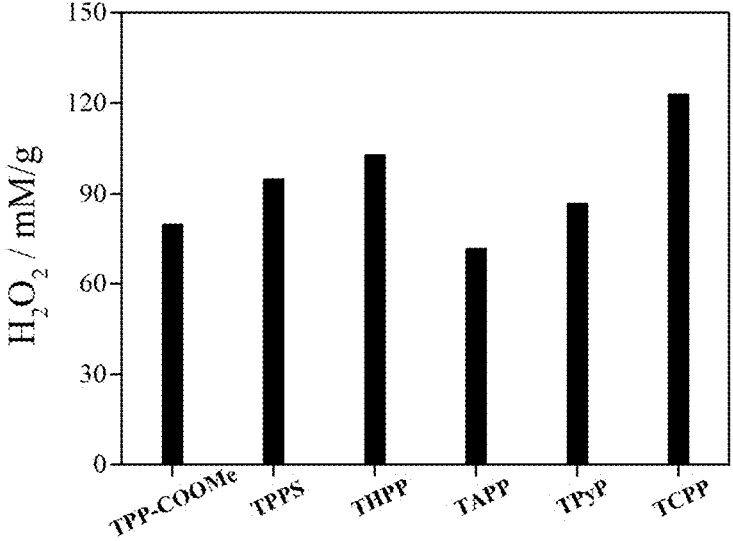
FIG. 1 is a diagram showing the production performance of hydrogen peroxide by photothermal catalysis with different porphyrins (in Examples 1 to 6)

The present disclosure will be further described below in conjunction with specific examples, but the protection scope of the present disclosure is not limited thereto.

Method for Determining the Concentration of
Hydrogen Peroxide

Hydrogen peroxide and potassium titanium oxalate may form a yellow complex solution. The absorbance of the complex solution at 400 nm is measured by using an ultraviolet spectrophotometer. The concentration of the hydrogen peroxide is calculated by using a Lambert-Beer law. The method specifically includes the following steps. 1 mL of a sample to be ed (a reaction liquid in examples or comparative examples) is taken every 1 h and filtered with a 0.45 μm filter membrane to remove catalyst particles. Then, 1 mL of a potassium titanium oxalate solution (0.02 M) and 3 mL of ultrapure water are added to obtain a mixed solution. At last, the concentration of the $H_2O_2$ was calculated based on the absorbance at 400 nm monitored by a UV-Vis spectrophotometer.

Sources of porphyrin catalysts in the present disclosure are as follows.

TPP-COOMe is purchased from Beijing Innochem Science & Technology Co., Ltd., and has a purity of 97%.

TPPS is purchased from Sigma-Aldrich Biochemical Technology Co., Ltd., and has a purity of 85%.

THPP is purchased from Beijing Innochem Science & Technology Co., Ltd., and has a purity of 97%.

TAPP is purchased from Aladdin Chemical Reagent Co., Ltd., and has a purity of 95%.

TPyP is purchased from Shanghai Haohong Biomedical Technology Co., Ltd., and has a purity of 97%.

TCPP is purchased from Beijing Innochem Science & Technology Co., Ltd., and has a purity of 97%.

Example 1

A photothermal catalytic method for production of hydrogen peroxide without a sacrificial reagent on the basis of TPP-COOMe included the following steps.

25 mg of the TPP-COOMe catalyst was dispersed evenly by ultrasound in 50 mL of ultrapure water in a 100 mL flask. Heating (at 60° C.) and magnetic stirring were conducted in an oil bath pot, $O_2$ flow rate was 80 mL/min, and irradiation was conducted by using a xenon lamp (π≥420 nm) with a light intensity of 90 mW/cm² for 4 h.

1 mL of a reaction liquid was taken every 1 h and filtered with a 0.45 μm filter membrane to remove the catalyst. Then, 1 mL of a potassium titanium oxalate solution (0.02 M) and 3 mL of ultrapure water were added to obtain a mixed solution. The absorbance of the mixed solution at 400 nm was measured by using an ultraviolet spectrophotometer, and the concentration of the hydrogen peroxide was calculated by using a Lambert-Beer law.

Example 2

A photothermal catalytic method for production of hydrogen peroxide without a sacrificial reagent on the basis of TPPS was provided. With Example 1 as a reference, the only difference was that the type of the porphyrin catalyst was changed, and specifically, the TPP-COOMe was changed to the TPPS.

Example 3

A photothermal catalytic method for production of hydrogen peroxide without a sacrificial reagent on the basis of THPP was provided. With Example 1 as a reference, the only difference was that the type of the porphyrin catalyst was changed, and specifically, the TPP-COOMe was changed to the THPP.

Example 4

A photothermal catalytic method for production of hydrogen peroxide without a sacrificial reagent on the basis of TAPP was provided. With Example 1 as a reference, the only difference was that the type of the porphyrin catalyst was changed, and specifically, the TPP-COOMe was changed to the TAPP.

Example 5

A photothermal catalytic method for production of hydrogen peroxide without a sacrificial reagent on the basis of TPyP was provided. With Example 1 as a reference, the only difference was that the type of the porphyrin catalyst was changed, and specifically, the TPP-COOMe was changed to the TPyP.

Example 6

A photothermal catalytic method for production of hydrogen peroxide without a sacrificial reagent on the basis of TCPP was provided. With Example 1 as a reference, the only difference was that the type of the porphyrin catalyst was changed, and specifically, the TPP-COOMe was changed to the TCPP. The method specifically included the following steps.

25 mg of the TCPP catalyst was dispersed evenly by ultrasound in 50 mL of ultrapure water in a 100 mL borosilicate flask sealed by a rubber cap with a pinhole. Heating (at 60° C.) and magnetic stirring were conducted in an oil bath pot, $O_2$ flow rate was 80 mL/min, and irradiation was conducted by using a xenon lamp (λ≥420 nm) for 4 h.

1 mL of a reaction liquid was taken every 1 h and filtered with a 0.45 μm filter membrane to remove the catalyst. Then, 1 mL of a potassium titanium oxalate solution (0.02 M) and 3 mL of ultrapure water were added to obtain a mixed solution. The absorbance of the mixed solution at 400 nm was measured by using an ultraviolet spectrophotometer, and the concentration of the hydrogen peroxide was calculated by using a Lambert-Beer law.

1. Comparison of Photothermal Catalytic Performance of Different Porphyrin Catalysts (in Examples 1 to 6) in Production of Hydrogen Peroxide FIG. 1 is a diagram showing comparison of photothermal catalytic performance of different porphyrin catalysts in Examples 1 to 6 in production of hydrogen peroxide. The irradiation is conducted for 4 h. From FIG. 1, it can be seen that when a cumulative production of the hydrogen peroxide obtained after a photothermal reaction at 60° C. for 4 h is used as an index to evaluate the photothermal catalytic ability of several porphyrin catalysts in production of the hydrogen peroxide, the photothermal catalytic ability of the several porphyrin catalysts in production of the hydrogen peroxide is in descending order as follows: TCPP>THPP>TPPS>TPyP>TPP-COOMe>TAPP. Specifically, the TCPP has the highest catalytic activity, and the hydrogen peroxide produced has a concentration of 123 mM/g (that is, 0.37 wt %). The THPP has the second highest catalytic activity, and the hydrogen peroxide produced has a concentration of 103 mM/g. The hydrogen peroxide produced by using the TPPS, the TPyP, the TPP-COOMe and the TAPP has a concentration of 95 mM/g, 87 mM/g, 80 mM/g and 72 mM/g respectively.

2. Morphology Characterization of the TCPP Photothermal Catalyst in Example 6

Figure 2:
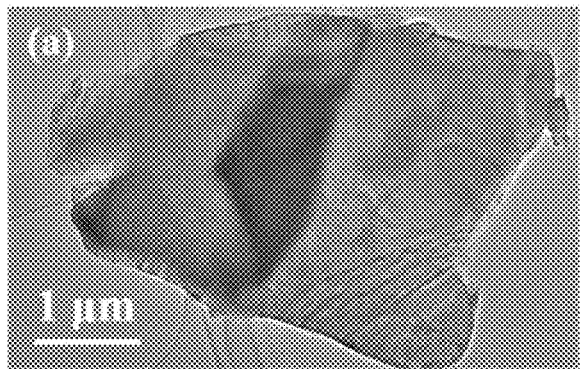
FIG. 2 is a transmission electron microscopy (TEM) image of a TCPP catalyst in Example 8.
Figure 3:
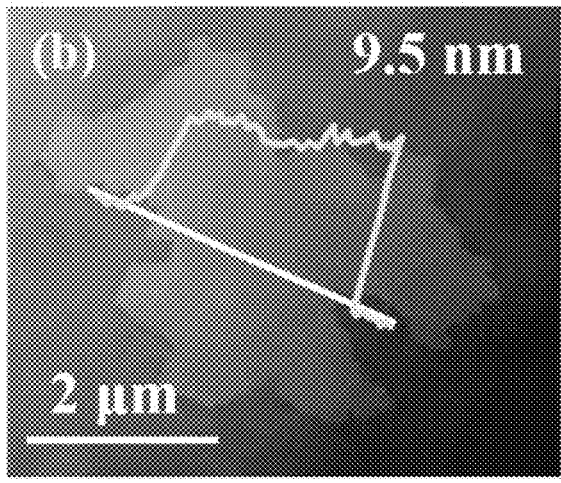
FIG. 3 is an atomic force microscopy (AFM) image of the TCPP catalyst in Example 8.

Morphology characterization was conducted on the TCPP photothermal catalyst with the best photothermal catalytic performance in production of hydrogen peroxide. FIG. 2 is a TEM image of the TCPP photothermal catalyst. The TEM image shows the morphology of the TCPP, the TCPP is a sheet with a size of about 4 μm×5 μm, and due to this large-sized sheet structure, more active sites are provided for the TCPP in production of the hydrogen peroxide. FIG. 3 is an AFM image of the TCPP. The AFM image shows that the TCPP has a nanosheet structure with a thickness of about 9.5 nm. Due to the nanometer thickness, rapid transfer of photogenerated carriers from the interior of the catalyst to the surface is facilitated, that is to say, separation and transfer rates of photogenerated electron-hole pairs are increased, and therefore, the photothermal catalytic efficiency is improved. Therefore, compared with other porphyrin catalysts, the TCPP has higher catalytic activity likely due to this large and thin nanosheet morphology structure.

Example 7

A photothermal catalytic method for production of hydrogen peroxide without a sacrificial reagent on the basis of TCPP was provided. With Example 6 as a reference, the only difference was that the amount of the TCPP catalyst was changed from 25 mg to 15 mg.

Example 8

A photothermal catalytic method for production of hydrogen peroxide without a sacrificial reagent on the basis of TCPP was provided. With Example 6 as a reference, the only difference was that the amount of the TCPP catalyst was changed from 25 mg to 50 mg.

3. Influence of the Amount of the TCPP Photothermal Catalyst (in Examples 6 to 8) on Photothermal Performance in Production of Hydrogen Peroxide The influence of the amount of the TCPP photothermal catalyst (in Examples 6 to 8) on photothermal performance in production of hydrogen peroxide is shown in Table 1.

TABLE 1

| Influence of the amount of the TCPP photothermal catalyst (in Examples 6 to 8) on photothermal performance in production of hydrogen peroxide | | | | | | |
|---|---|---|---|---|---|---|
| Example | Amount of TCPP (mg) | Amount of water (mL) | Temperature (° C.) | Oxygen flow rate (mL/min) | Irradiation time (h) | Concentration of hydrogen peroxide |
| 6 | 25 | 50 | 60 | 80 | 4 | 123 mM/g (that is, 0.37 wt %) |
| 7 | 15 | 50 | 60 | 80 | 4 | 42 mM/g (that is, 0.13 wt %) |
| 8 | 50 | 50 | 60 | 80 | 4 | 70 mM/g (that is, 0.21 wt %) |

From comparison of the data in Table 1, it can be seen that when the ultrapure water is 50 mL, the temperature is 60° C., the oxygen flow rate is 80 mL/min and the irradiation time is 4 h, by optimizing the production of the hydrogen peroxide produced by photothermal catalysis with the TCPP in an amount range of 15-50 mg, the optimal amount of the TCPP is 25 mg.

Example 9

A photothermal catalytic method for production of hydrogen peroxide without a sacrificial reagent on the basis of TCPP was provided. With Example 6 as a reference, the only difference was that the amount of the ultrapure water was changed from 50 mL to 100 mL, and accordingly, a 150 mL borosilicate flask was used as a reaction vessel.

Example 10

A photothermal catalytic method for production of hydrogen peroxide without a sacrificial reagent on the basis of TCPP was provided. With Example 6 as a reference, the only difference was that the amount of the ultrapure water was changed from 50 mL to 20 mL, and accordingly, a 50 mL borosilicate flask was used as a reaction vessel.

4. Influence of the Amount of the Ultrapure Water (in Example 6 and Examples 9 to 10) on Photothermal Catalytic Performance of the TCPP Catalyst in Production of Hydrogen Peroxide

TABLE 2

Influence of the amount of the ultrapure water (in Example 6 and Examples 9 to 10) on photothermal catalytic performance of the TCPP catalyst in production of hydrogen peroxide

| Example | Amount of TCPP (mg) | Amount of water (mL) | Temperature (° C.) | Oxygen flow rate (mL/min) | Irradiation time (h) | Concentration of hydrogen peroxide |
|---|---|---|---|---|---|---|
| 6 | 25 | 50 | 60 | 80 | 4 | 123 mM/g (that is, 0.37 wt %) |
| 9 | 25 | 100 | 60 | 80 | 4 | 39 mM/g (that is, 0.12 wt %) |
| 10 | 25 | 20 | 60 | 80 | 4 | 66 mM/g (that is, 0.20 wt %) |

From comparison of the data in Table 2, it can be seen that the amount of the ultrapure water is preferably 50 mL.

Example 11

A photothermal catalytic method for production of hydrogen peroxide without a sacrificial reagent on the basis of TCPP was provided. With Example 6 as a reference, the only difference was that the oxygen flow rate was changed from 80 mL/min to 50 mL/min.

Example 12

A photothermal catalytic method for production of hydrogen peroxide without a sacrificial reagent on the basis of TCPP was provided. With Example 6 as a reference, the only difference was that the oxygen flow rate was changed from 80 mL/min to 150 mL/min.

5. Influence of the Oxygen Flow Rate (in Example 6 and Examples 11 to 12) on Photothermal Catalytic Performance of the TCPP Catalyst in Production of Hydrogen Peroxide

TABLE 3

Influence of the oxygen flow rate (in Example 6 and Examples 11 to 12) on photothermal catalytic performance of the TCPP catalyst in production of hydrogen peroxide

| Example | Amount of TCPP (mg) | Amount of water (mL) | Temperature (° C.) | Oxygen flow rate (mL/min) | Irradiation time (h) | Concentration of hydrogen peroxide |
|---|---|---|---|---|---|---|
| 6 | 25 | 50 | 60 | 80 | 4 | 123 mM/g (that is, 0.37 wt %) |
| 11 | 25 | 50 | 60 | 50 | 4 | 56 mM/g (that is, 0.17 wt %) |
| 12 | 25 | 50 | 60 | 150 | 4 | 69 mM/g (that is, 0.21 wt %) |

From comparison of the data in Table 3, it can be seen that the oxygen flow rate is preferably 80 mL/min. According to the research in the present disclosure, it is found that when the oxygen flow rate is high (such as 150 mL/min), increase of the yield of the hydrogen peroxide is not facilitated.

Comparative Example 1

A photothermal catalytic method for production of hydrogen peroxide without a sacrificial reagent on the basis of TCPP was provided. With Example 6 as a reference, the only difference was that the reaction temperature was changed from 60° C. to 20° C. (under room temperature conditions).

Example 13

A photothermal catalytic method for production of hydrogen peroxide without a sacrificial reagent on the basis of TCPP was provided. With Example 6 as a reference, the only difference was that the reaction temperature was changed from 60° C. to 40° C.

Example 14

A photothermal catalytic method for production of hydrogen peroxide without a sacrificial reagent on the basis of TCPP was provided. With Example 6 as a reference, the only difference was that the reaction temperature was changed from 60° C. to 80° C.

Figure 4:
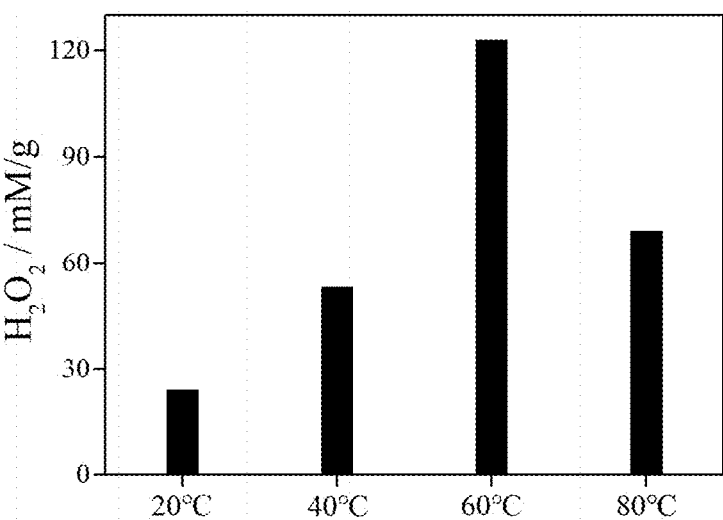
FIG. 4 is a diagram showing a relationship between the concentration of hydrogen peroxide produced by photothermal catalysis with the TCPP and the reaction temperature (in Example 6, Examples 13 to 14 and Comparative Example 1)

6. Influence of the Reaction Temperature (in Example 6, Examples 13 to 14 and Comparative Example 1) on Photothermal Catalytic Performance of the TCPP Catalyst in Production of Hydrogen Peroxide FIG. 4 is a diagram showing a relationship between the concentration of hydrogen peroxide produced by photothermal catalysis with the TCPP and the reaction temperature (in Example 6, Examples 13 to 14 and Comparative Example 1). From FIG. 4, it can be seen that with increase of the temperature, the catalytic activity of the TCPP is first improved and then reduced. Specifically, when the reaction temperature is increased from 20° C. to 60° C., the concentration of the hydrogen peroxide produced by a photothermal reaction is increased from 24 mM/g to 123 mM/g. When the reaction temperature is increased from 60° C. to 80° C., the concentration of the hydrogen peroxide is decreased from 123 mM/g to 69 mM/g.

Compared with the photothermal catalytic performance of the TCPP catalyst in production of hydrogen peroxide at room temperature in Comparative Example 1, when the temperature is appropriately increased during photocatalysis, the yield of the hydrogen peroxide is greatly increased.

It is indicated that the TCPP catalyst has excellent photothermal catalytic performance in the production of hydrogen peroxide (in the prior art, it has not been reported that a porphyrin-based supermolecule catalyst has photothermal catalytic performance in production of hydrogen peroxide).

Example 15

A photothermal catalytic method for production of hydrogen peroxide without a sacrificial reagent on the basis of TCPP was provided. With Example 6 as a reference, the only difference was that the irradiation time was changed from 4 h to 2 h.

Example 16

A photothermal catalytic method for production of hydrogen peroxide without a sacrificial reagent on the basis of TCPP was provided. With Example 6 as a reference, the only difference was that the irradiation time was changed from 4 h to 6 h.

Example 17

A photothermal catalytic method for production of hydrogen peroxide without a sacrificial reagent on the basis of TCPP was provided. With Example 6 as a reference, the only difference was that the irradiation time was changed from 4 h to 12 h.

Example 18

A photothermal catalytic method for production of hydrogen peroxide without a sacrificial reagent on the basis of TCPP was provided. With Example 6 as a reference, the only difference was that the irradiation time was changed from 4 h to 18 h.

Example 19

A photothermal catalytic method for production of hydrogen peroxide without a sacrificial reagent on the basis of TCPP was provided. With Example 6 as a reference, the only difference was that the irradiation time was changed from 4 h to 24 h.

Figure 5:
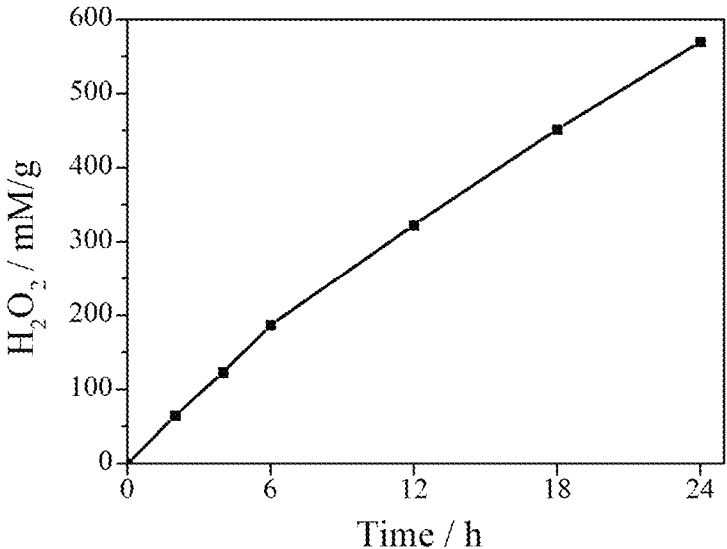
FIG. 5 is a diagram showing a relationship between the concentration of hydrogen peroxide produced by photothermal catalysis with the TCPP and the reaction time (in Example 6 and Examples 15 to 19).

7. Influence of the Irradiation Time (in Example 6 and Examples 15 to 19) on Photothermal Catalytic Performance of the TCPP Catalyst in the Production of Hydrogen Peroxide FIG. 5 is a diagram showing a relationship between the concentration of hydrogen peroxide produced by photothermal catalysis with the TCPP and the reaction time (in Example 6 and Examples 15 to 19). From FIG. 5, it can be seen that after a photothermal reaction is carried out at 60° C. for 2 h, 4 h, 6 h, 12 h, 18 h and 24 h, an aqueous hydrogen peroxide solution (hydrogen peroxide solution) with a concentration of 65 mM/g (that is, 0.19 wt %), 123 mM/g (that is, 0.37 wt %), 187 mM/g (that is, 0.56 wt %), 323 mM/g (that is, 0.97 wt %), 452 mM/g (that is, 1.36 wt %) and 570 mM/g (that is, 1.71 wt %) may be prepared respectively. After the change of slope in FIG. 5 is analyzed, it can be found that when the irradiation time is longer than 6 h, the yield of the hydrogen peroxide per unit time is slightly reduced. However, when the irradiation time lasts from 6 h to 24 h, the slope is not significantly changed, indicating that by using the photothermal catalytic method for production of hydrogen peroxide without a sacrificial reagent on the basis of TCPP in the present disclosure, the TCPP photothermal catalyst has efficient and stable catalytic performance (after the catalyst is continuously used for 24 h, the performance is not significantly reduced). A reaction liquid obtained after a photothermal reaction for 24 h is concentrated by distillation under reduced pressure to obtain commercially available hydrogen peroxide with a concentration of about 3.00 wt %. Therefore, the TCPP photothermal catalyst has a great application prospect.

What is claimed is:

1. A method for photothermal catalytic production of hydrogen peroxide without a sacrificial reagent on the basis of a porphyrin-based supermolecule, comprising the following steps:

(1) ultrasonically dispersing a porphyrin catalyst in water to obtain a porphyrin catalyst dispersion with a concentration of 0.3-1.5 g/L of the porphyrin catalyst, wherein the porphyrin catalyst is at least one selected from the group consisting of 5,10,15,20-tetrakis(4-methoxycarbonylphenyl)porphyrin (TPP-COOMe), 5,10,15,20-tetrakis(4-sulfophenyl)porphyrin (TPPS), 5,10,15,20-tetrakis(4-hydroxyphenyl)porphyrin (THPP), 5,10,15,20-tetrakis(4-aminophenyl)porphyrin (TAPP), 5,10,15,20-tetrakis(4-pyridyl)porphyrin (TPyP), and 5,10,15,20-tetrakis(4-carboxyphenyl)porphyrin (TCPP);

(2) continuously introducing $O_2$ into the porphyrin catalyst dispersion obtained in step (1) at a temperature of 40-80° C., and conducting stirring and irradiation with a visible light for a reaction for a period of time; and (3) filtering a reaction product obtained in step (2) to obtain an aqueous hydrogen peroxide solution.

2. The method according to claim 1, wherein the porphyrin catalyst is at least one selected from the group consisting of 5,10,15,20-tetrakis(4-carboxyphenyl)porphyrin, 5,10,15,20-tetrakis(4-hydroxyphenyl)porphyrin and 5,10,15,20-tetrakis(4-sulfophenyl)porphyrin.

3. The method according to claim 2, wherein the porphyrin catalyst is 5,10,15,20-tetrakis(4-carboxyphenyl)porphyrin.

4. The method according to claim 1, wherein, in step (2), the reaction is carried out at a temperature of 60° C.

5. The method according to claim 1, wherein, in step (2), the oxygen is introduced at a flow rate of 50-150 mL/min.

6. The method according to claim 5, wherein, in step (2), the oxygen is introduced at a flow rate of 80 mL/min.

7. The method according to claim 1, wherein, in step (3), the visible light has a light intensity of 80-150 $mW/cm^2$.

8. The method according to claim 7, wherein, in step (3), the visible light has a light intensity of 90 $mW/cm^2$.

9. The method according to claim 1, wherein, in step (2), the irradiation is conducted for 2-24 hours.

10. The method according to claim 1, wherein, an amount ratio of the porphyrin catalyst to the water is 1 mg: 2 mL.

11. The method according to claim 1, wherein, in step (2), the visible light is provided by a xenon lamp with an additional 420 nm cut-off filter.

12. The method according to claim 1, wherein, after the filtering is completed, the step (3) further comprises concentrating a filtrate.

13. The method according to claim 1, wherein the step (3) further comprises washing a filter cake with ultrapure water, drying the washed filter cake and recovering the porphyrin catalyst.

* * * * *